United States Patent
Gomez Uribe et al.

(10) Patent No.: US 10,311,386 B2
(45) Date of Patent: Jun. 4, 2019

(54) IDENTIFYING SIMILAR ITEMS BASED ON INTERACTION HISTORY

(75) Inventors: Carlos Alberto Gomez Uribe, Mountain View, CA (US); Eric Lucas, Mountain View, CA (US); Satish Kumar Krishnamurthy, Los Gatos, CA (US); Christopher Francis Pouliot, San Mateo, CA (US)

(73) Assignee: NETFLIX, INC., Los Gatos, CA (US)

( * ) Notice: Subject to any disclaimer, the term of this patent is extended or adjusted under 35 U.S.C. 154(b) by 1441 days.

(21) Appl. No.: 13/179,392

(22) Filed: Jul. 8, 2011

(65) Prior Publication Data
US 2013/0013372 A1    Jan. 10, 2013

(51) Int. Cl.
G06Q 10/00    (2012.01)
G06Q 10/06    (2012.01)
G06Q 30/02    (2012.01)

(52) U.S. Cl.
CPC .......... *G06Q 10/06* (2013.01); *G06Q 30/0201* (2013.01)

(58) Field of Classification Search
CPC ..... G06Q 10/06; G06Q 30/0201; Y04S 10/54
USPC ........................................ 705/7.29
See application file for complete search history.

(56) References Cited

U.S. PATENT DOCUMENTS

| | | | |
|---|---|---|---|
| 5,790,426 A * | 8/1998 | Robinson ..................... | 702/179 |
| 6,266,649 B1 * | 7/2001 | Linden ............. | G06Q 10/08345 705/14.51 |
| 7,403,910 B1 | 7/2008 | Hastings et al. | |
| 7,970,644 B2 * | 6/2011 | Hedley et al. ................... | 705/13 |
| 8,055,655 B1 * | 11/2011 | He ......................... | G06F 16/248 707/727 |
| 8,311,950 B1 * | 11/2012 | Kunal ................ | G06Q 30/0201 705/319 |
| 8,825,474 B1 * | 9/2014 | Zhai ...................... | G06F 17/276 704/1 |
| 8,868,570 B1 * | 10/2014 | Skut ...................... | G06F 16/951 707/749 |
| 2006/0041548 A1 | 2/2006 | Parsons et al. | |

(Continued)

OTHER PUBLICATIONS

Sawers (Netflix Never Used Its $1m Algorithm. Here's Why. Apr. 13, 2012).*

(Continued)

*Primary Examiner* — Folashade Anderson
(74) *Attorney, Agent, or Firm* — Artegis Law Group, LLP

(57) ABSTRACT

One embodiment of the invention sets forth a mechanism for identifying similar items within a plurality of items available to a group of users. The mechanism includes identifying a first count that indicates a number of times any user has interacted with a first item included in the plurality of items and subsequently with any other item, identifying a second count that indicates a number of times any user within the has interacted with a second item included in the plurality of items after interacting with the first item, computing a probability that indicates the likelihood of a particular user interacting with the second item after interacting with the first item based on the first count and the second count, and computing a similarity score that indicates the similarity between the first item and the second item based on the probability and a popularity score associated with the second item.

20 Claims, 4 Drawing Sheets

(56) References Cited

U.S. PATENT DOCUMENTS

| | | | |
|---|---|---|---|
| 2008/0097821 A1* | 4/2008 | Chickering | G06Q 30/0201 705/7.29 |
| 2010/0010877 A1 | 1/2010 | Hunt et al. | |
| 2010/0251305 A1 | 9/2010 | Kimble et al. | |
| 2010/0268661 A1* | 10/2010 | Levy et al. | 705/347 |
| 2011/0184806 A1* | 7/2011 | Chen et al. | 705/14.52 |
| 2012/0096013 A1* | 4/2012 | Ciancutti et al. | 707/749 |
| 2013/0013458 A1* | 1/2013 | Uribe | G06Q 30/0201 705/26.64 |

OTHER PUBLICATIONS

Iskold (The Art, Science and Business of Recommendation Engines Jan. 16, 2007).*
Wilson et al (How Netflix Works, from http://electronics.howstuffworks.com/netflix5.htm, unknown publication date, retrieved Jul. 8, 2013).*
Mangalindan (Amazon's recommendation secret, from CNN Money, Jul. 30, 2012, retrieved Jul. 8, 2013).*
International Search Report PCT/US12/045850 dated Nov. 2, 2012.
De Wit, Joost, "Evaluating Recommender Systems—An evaluation framework to predict user satisfaction for recommender systems in an electronic programme guide context" (online), May 16, 2008, University of Twente, Retrieved from the internet at URL: <http://eprints.eemcs.utwente.nl/13083/>.

\* cited by examiner

IDENTIFYING SIMILAR ITEMS BASED ON INTERACTION HISTORY

BACKGROUND OF THE INVENTION

Field of the Invention

The present invention relates generally to online content distribution and, more specifically, to identifying similar items based on interaction history.

Description of the Related Art

Conventional digital content distribution systems include a content server, an application, a content player, and a communications network connecting the content server to the content player. The content server is configured to store digital content items corresponding to different content titles that can be downloaded from the content server to the content player. The application allows a user of the content player to browse through available digital content and manage account information, etc.

Typical digital content distribution systems offer a large variety of digital media to the user for viewing. In order to enhance the user experience, content distribution systems often personalize digital media recommendations to the individual user. One approach to recommending digital media involves determining digital media of interest to the individual user based on the preferences of similar users. One drawback to this approach, however, is that a large amount of data needs to be stored and managed in order to determine similar users making such an approach is inappropriate in some situations.

Another technique implemented by content distribution systems when recommending digital media to a user is to identify digital media that is similar to digital media previously viewed by the user. One implementation of such a recommendation system involves attaching meta-data tags to digital media, such that digital media having the same meta-data tags are deemed to be similar. However, given the large variety of digital media available, thousands of meta-data tags are needed to accurately describe the contents of digital media. Managing the meta-data tags and performing similarity computations based on the multitude of tags is computationally and storage space intensive. In addition, because meta-data tags are often attached to digital media based on the perception of an individual, the tags may not accurately describe the contents of the digital media, and, therefore, any similarity computation performed based on the tags may not be accurate. Lastly, the set of meta-tags that optimally determine similarity of digital media and/or the extent to which each tag should contribute to this similarity typically varies depending on the actual content being evaluated, making global scoring functions based on meta-tags sub-optimal, and content-specific ones difficult to estimate.

As the foregoing illustrates, what is needed in the art is a more efficient and accurate mechanism for identifying digital media that is similar to digital media previously-viewed by a user.

SUMMARY OF THE INVENTION

One embodiment of the invention sets forth a method for identifying two or more similar items within a plurality of items available to a group of users. The method includes identifying a first count that indicates a number of times any user within the group of users has interacted with a first item included in the plurality of items and subsequently interacting with any other item, identifying a second count that indicates a number of times any user within the group of users has interacted with a second item included in the plurality of items after interacting with the first item, computing a probability that indicates the likelihood of a particular user within the group of users interacting with the second item after interacting with the first item based on the first count and the second count, and computing a similarity score that indicates the similarity between the first item and the second item based on the probability and a popularity score associated with the second item. The popularity score of the second item is the percentage of all interactions of all users with all items that involve the second item. Importantly, to correct for unwanted biases that originate from multiple items being available at different time periods, the previous computations are performed for every pair of items using data from the periods of time when both items were accessible to the users; data from all other periods of time are ignored.

One advantage of the disclosed method is that digital content recommendations made to a user are more accurate when the technique described herein is used to determine similarity based on viewing patterns across a group of users.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
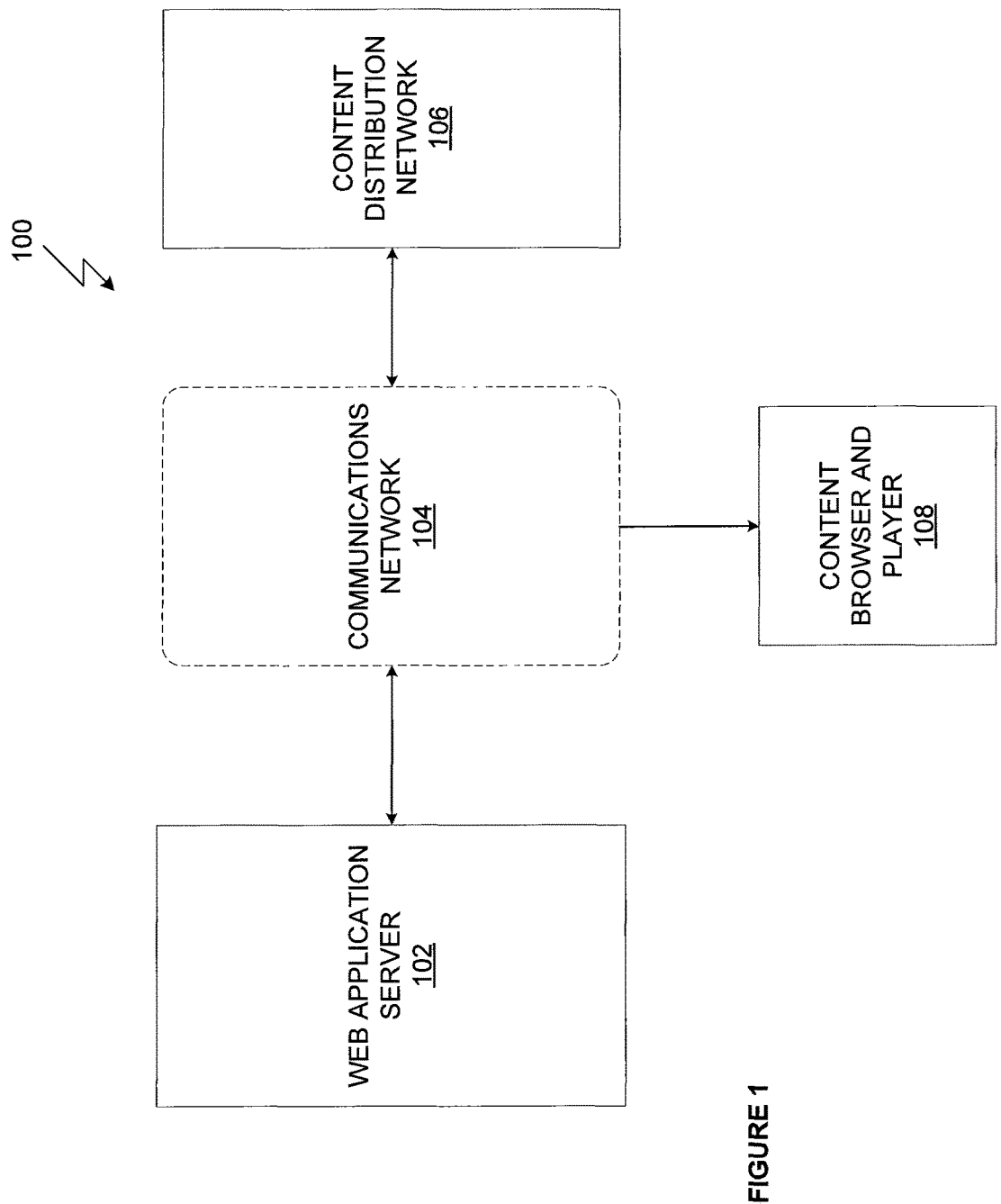
FIG. 1 illustrates a content browsing and distribution system configured to implement one or more aspects of the invention.

FIG. 1 illustrates a content browsing and distribution system 100 configured to implement one or more aspects of the invention. As shown, the content browsing and distribution system 100 includes a web application server 102, a communications network 104, a content distribution network (CDN) 106 and a content browser and player 108.

The communications network 104 includes a plurality of network communications systems, such as routers and switches, configured to facilitate data communication between the web application server 102, the CDN 106 and the content browser and player 108. Persons skilled in the art will recognize that many technically feasible techniques exist for building the communications network 104, including technologies practiced in deploying the well-known Internet communications network.

The web application server 102 is a computer system configured to host a web application that is accessed by the content browser and player 108. The web application hosted by the web application server 102 allows a user of content browser and player 108 to browse through available digital content, manage account information, receive content recommendations, etc. One embodiment of the content recommendation functionality, i.e., content similarity based recommendation, is discussed in greater detail below in conjunction with FIGS. 2-4.

The CDN 106 comprises one or more computer systems configured to serve download requests for digital media (referred to "digital content items" herein) from the content browser and player 108. The digital content items may reside on a mass storage system accessible to the computer system. The mass storage system may include, without limitation, direct attached storage, network attached file storage, or network attached block-level storage. The digital content items may be formatted and stored on the mass storage system using any technically feasible technique. A data transfer protocol, such as the well-known hyper-text transfer protocol (HTTP), may be used to download digital content items from the content server 106 to the content browser and player 108.

The content browser and player 108 may comprise a computer system, a set top box, a mobile device such as a mobile phone, or any other technically feasible computing platform that has network connectivity and is coupled to or includes a display device and speaker device for presenting video frames, and generating acoustic output, respectively. The content browser and player 108 interacts with the web application server 102 and the CDN 106 to display available digital content information, gather user preferences and play digital content items.

Although, in the above description, the content browsing and distribution system 100 is shown with one content browser and player 108 and one CDN 106, persons skilled in the art will recognize that the architecture of FIG. 1 contemplates only an exemplary embodiment of the invention. Other embodiments may include any number of content browser and players 108 and/or CDNs 106. Thus, FIG. 1 is in no way intended to limit the scope of the present invention in any way.

Figure 2:
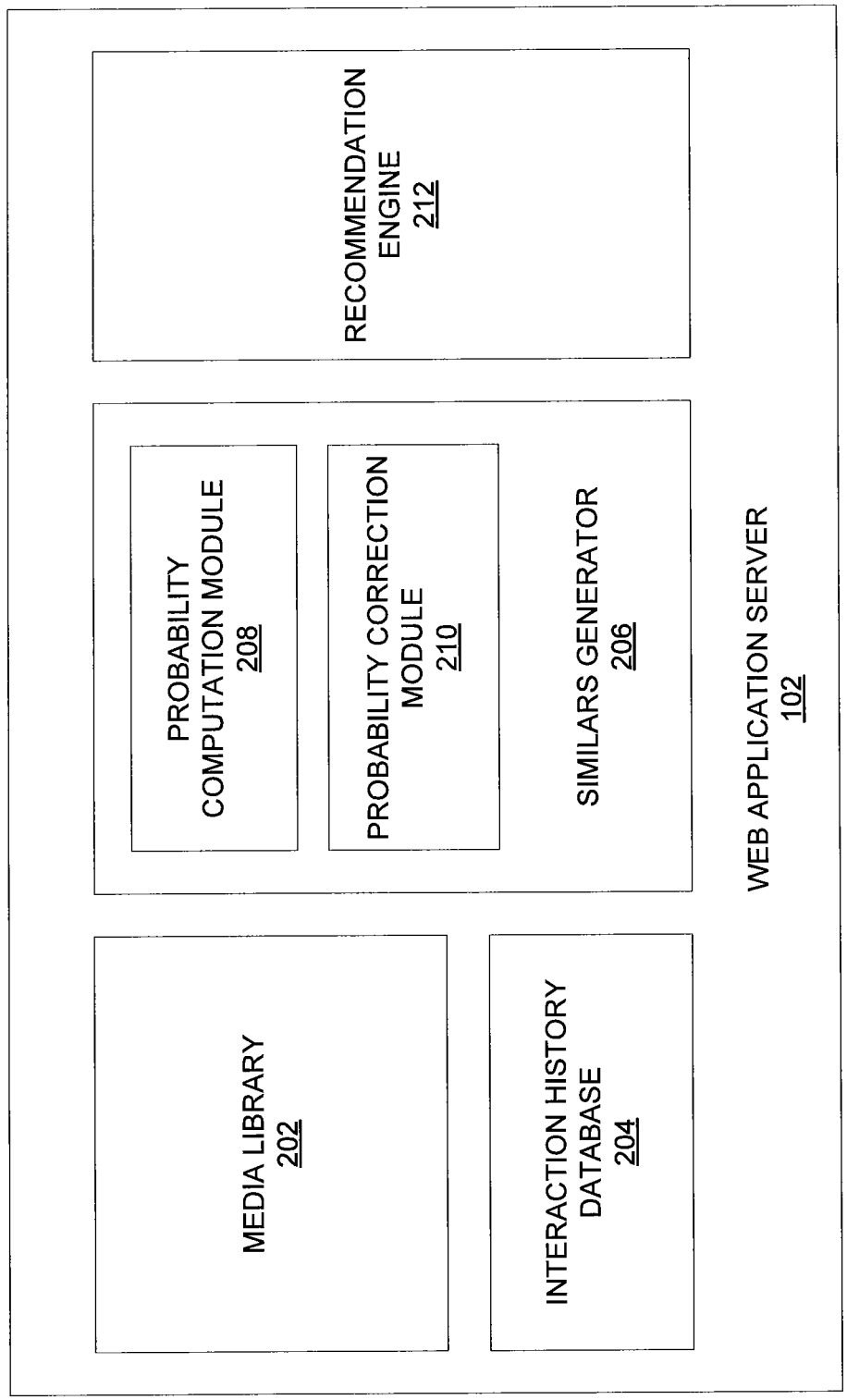
FIG. 2 is a more detailed illustration of the web application server of FIG. 1, according to one embodiment of the invention.

FIG. 2 is a more detailed illustration of the web application server 102 of FIG. 1, according to one embodiment of the invention. As shown, the web application server 102 includes a media library 202, interaction history database 204, a similarity computation engine 206 and a recommendation engine 212.

The media library 202 includes a list of digital content items with which users of the web application server interact. An interaction with a digital content item may include an user action on an item, such as viewing the digital content item, rating the digital content item, adding an item to a set of items of interest (such as a preference queue), searching for an item in a search engine, or even clicking or otherwise navigating to a more detailed description of an item. Any combination of different interaction types would also fit the framework described here.

Digital content items may include video data, such as movies, image data, such as photographs, or audio data, such as songs. Persons skilled in the art would understand that any other digital content items are within the scope of the present invention, and the recommendation and similarity determination techniques described herein can be applied to any such digital content items. In one embodiment, the media library 202 includes only references to digital content items that are stored within the CDN 106 for distribution to users, such as the user of the content browser and player 108.

The interaction history database 204 stores the interaction history related to users of the content browsing and distribution system 100. In the case of the content browser and player 108, each time a user interacts with a particular digital content item via the content browser and player 108, the interaction is recorded in the interaction history database 204. Along with information identifying the user and the particular digital content item, the recorded interaction may also include the time and date when each interaction started, and the duration that the user interacted with the digital content item. For other interaction types the strength of the interaction is stored; for example, if the interaction is a rating, then the actual rating value is stored rather than an interaction duration. Based on recorded interactions, a comprehensive interaction history of the user can be determined. For example, based on two consecutive recorded interactions, the interaction history of the user indicates which digital content item the user chose to interact with after a particular digital content item.

The similarity computation engine 206, for a particular digital item, identifies other digital items that are statistically similar to the particular digital item. The statistical similarity between two digital items is determined based on the interaction histories related to users who have interacted with those digital items. As described below, the probability computation module 208 and probability correction module 210 included in the similarity computation engine 206 operate in conjunction to identify statistically similar digital content items.

The probability computation module 208 computes, for each unique digital content item identified by the media library 202, an interaction probability that indicates the likelihood of that digital content being interacted with by the user after the user interacts with a particular digital content item. Such a computation is based on the viewing histories stored in the interaction history database 204 and may be performed via the following equation:

$$P_{ij} = \frac{\eta_{ij}}{d_i} \quad \text{(Equation 1)}$$

where $P_{ij}$ is the interaction probability that digital content item j is interacted with after digital content item i, given that a user has interacted with digital content item i, $\eta_{ij}$ is the count of interactions of digital content item j after digital content item i has been interacted with based on the interaction histories stored in the interaction history database 204, and $d_i$ the count of interactions of digital content item i based on the interactions histories stored in the interaction history database 204.

In one embodiment, the interactions that are included in the count $\eta_{ij}$ are weighted according to several metrics. Such metrics include the duration that the digital content items i and j were interacted with, the separation in time between interacting with the digital content item i and the digital content item j, the genre similarity between the digital content item i and digital content item j, and/or any other technically feasible metric.

The probability computation module 208 computes an interaction probability for each unique pair of digital content items identified by the media library 202. In one embodiment, the probabilities are organized into a Markov Chain. In other embodiments, any other technically feasible mechanism for organizing probabilities may be used.

Next, to compute a similarity score between two digital content items, the probability correction module 210 corrects the interaction probability $P_{ij}$ based on the popularity of digital content item j and any other noise in the interaction history. To correct for the popularity of digital content item j, the probability correction module 210 utilizes the following equation:

$$OR_{ij} = \frac{P_i P_{ij}}{P_i P_j} \quad \text{(Equation 2)}$$

where $OR_{ij}$, termed the odds ratio, is the similarity score of digital content item i and digital content item j that is corrected for the popularity of digital content item j, $P_i$ is the probability that digital content item i will be interacted with at random, $P_{ij}$ is the interaction probability computed by the interaction probability computation module 208, and $P_j$ is the probability that digital content item j will be interacted with at random.

To correct for noise from low counts in the interaction probability computation, the probability correction module 210 then utilizes the following equation:

$$COR_{ij} = OR_{ij}(1+\mu^2-2\mu) \quad \text{(Equation 3)}$$

where $COR_{ij}$ is the corrected odds ratio, the similarity score between digital content item i and digital content item j that is corrected for the popularity of digital content item j and noise. Here $OR_{ij}$ is the odds ratio, or similarity score corrected for popularity, and $\mu$ is the noise. In one embodiment, the noise $\mu$ may be computed via the following equation:

$$\mu \cong \frac{1}{n_{ij}} + \frac{1}{d_i} \quad \text{(Equation 4)}$$

The similarity scores $COR_{ij}$ for different digital content items j can then be ordered in decreasing order, where the digital content item j associated with the most positive $COR_{ij}$ is the most similar to digital content item i. Also, a digital content item j associated with a $COR_{ij}$ that is less than one is dissimilar to digital content item i as digital content item j is more likely to be watched after digital content item i randomly than because of a statistical similarity computed based on interaction histories. Other embodiments combine the popularity of item j with the corrected odds ratio to define similarity in order to produce more popular similar digital content items. One such example is the product of $P_{ij}$ and $COR_{ij}$.

The computations required for the previous stages, including the popularity of items i and j Pi and Pj, the probability Pij, and the noise $\mu$, are all computed for each pair of items i and j using data from periods of time when both items were available to the users. User data from periods of time when only one of the two items are available are ignored. Such temporal correction significantly enhances the accuracy of the similarity metric.

The recommendation engine 212 recommends digital content items to users of the content browsing and distribution system 100, such as the user of content browser and player 108, based, at least in part, on the similarity scores computed by the similarity computation engine. More specifically, when a user interacts with digital content item i, the recommendation engine 212, recommends digital content items j associated similarity scores $COR_{ij}$ that are above a pre-determined threshold. In such a manner, a user is presented with recommendations of digital content items that are determined to be statistically similar to a digital content item with which the user has interacted.

In the embodiment where the probabilities computed by the probability computation module 208 are organized into a Markov Chain, the Markov Chain is modified to account for the variability of the digital content items being available to the users of the content browsing and distribution system 100. In operation, when computing the interaction probabilities for a pair of digital content items, the probability computation module 208 only accesses interaction history data stored in the interaction history database 204 that corresponds to the period of time when both digital content items were available in the media library 202.

In addition, in such an embodiment, to decrease the effects of noise several independent Markov Chains may be determined. For example, a first chain specifies the probabilities that are computed based on a number and a chronological sequence of interactions related to different digital content items. A second chain specifies the probabilities that are computed based on a duration of time spent on interactions related to different digital content items. A third chain specifies the probabilities that are computed based on fractional interactions related to different digital content items, e.g., an interaction of 50 minutes on a 100-minute-long title contributes 0.5 fractional interactions. Another three chains that are the time-reversed versions of the first three chains can then be determined as well. Finally, each of the six chains is used to produce a similarity score for every pair of digital content items, where each similarity score related to a pair of digital content items is combined in a technically feasible manner to obtain a more robust similarity score.

The operation of the similarity computation engine 206 as described above can be applied to a multitude of interactions, such as views, purchases, etc. In addition, any type of interaction, including viewing of items, can be recorded and used as a basis of computing the probabilities and similarity scores discussed above.

Figure 3:
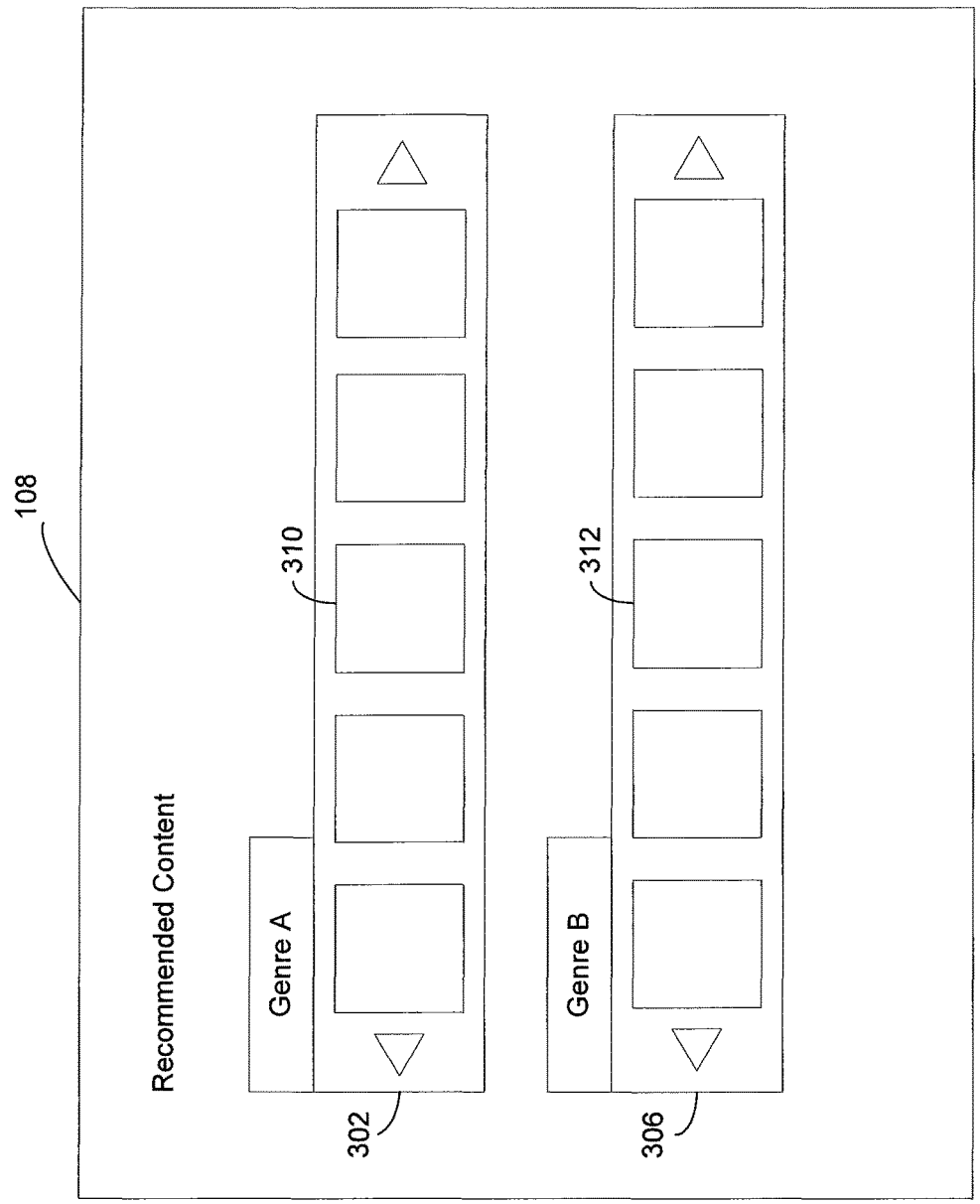
FIG. 3 is a conceptual diagram illustrating recommended digital content items displayed in the content browser and player of FIG. 1, according to one embodiment of the invention.

FIG. 3 is a conceptual diagram illustrating recommended digital content items displayed in the content browser and player 108 of FIG. 1, according to one embodiment of the invention. As shown, the content browser and player 108 includes row 302 and row 306 associated with genres A and B, respectively. Digital content 310 included in row 302 and digital content 312 included in row 306 is recommended to the user of content browser and player 108 based on a similarity detected between a digital content item that was previously-interacted with by the user. The similarity is detected based on the techniques of the similarity computation engine 206 described previously herein.

Figure 4:
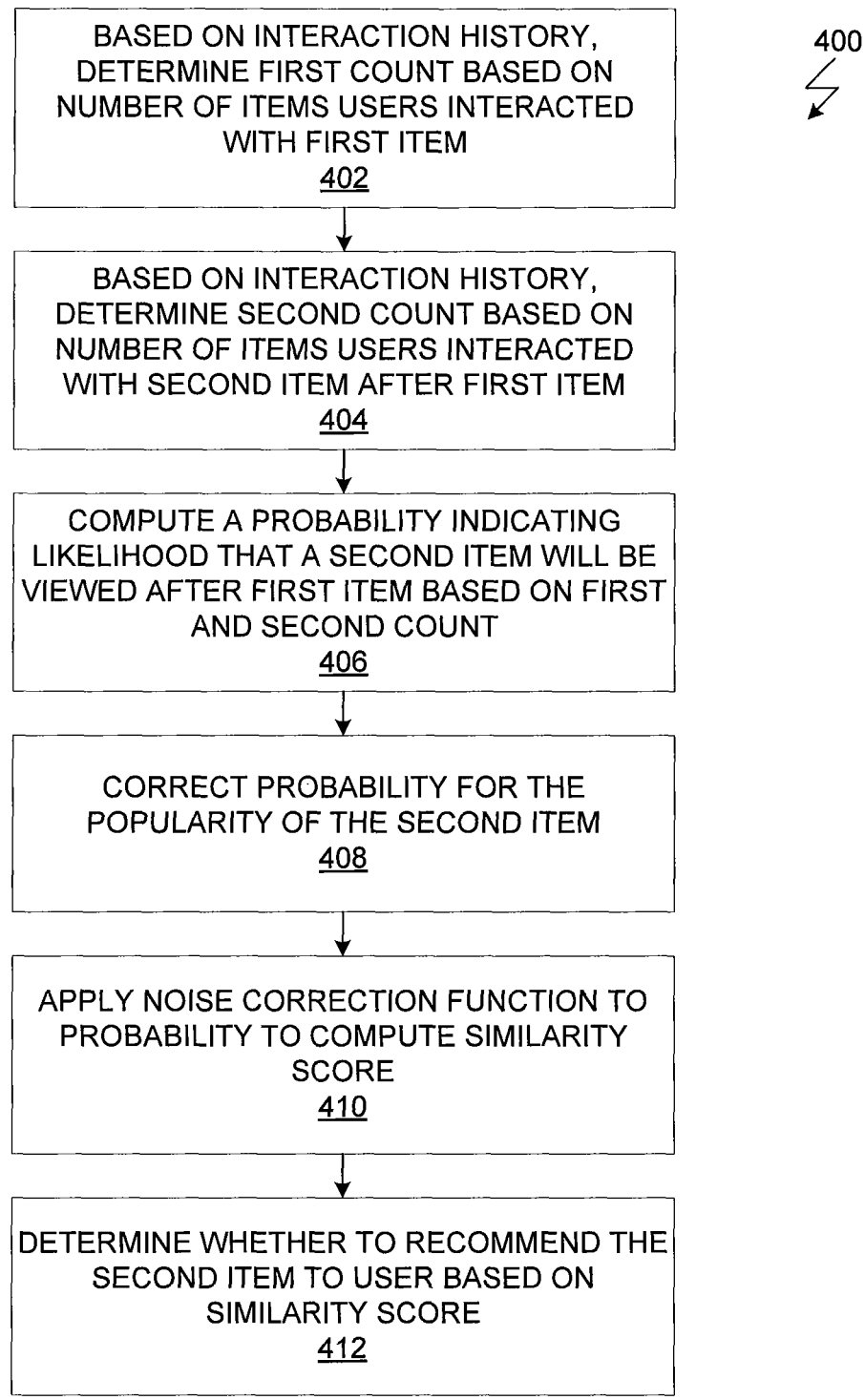
FIG. 4 is a flow diagram of method steps for determining the similarity score between a first item and a second item, according to one embodiment of the invention.

FIG. 4 is a flow diagram of method steps for determining the similarity score between a first item and a second item, according to one embodiment of the invention. Although the method steps are described in conjunction with the systems for FIGS. 1-2, persons skilled in the art will understand that any system configured to perform the method steps, in any order, is within the scope of the invention.

The method 400 begins at step 402, the probability computation module 208 determines a first count that indicates the number of interactions related to a first digital content item based on the interaction histories stored in the interaction history database 204. At step 404, the probability computation module 208 determines a second count that indicates the number of interactions related to a second digital content item after a user interacted with the first digital content item based on the interaction histories stored in the interaction history database 204.

At step 406, the probability computation module 208 computes a probability that indicates the likelihood of a particular user interacting with the second digital content item after interacting with the first digital content item based on the first count and the second count. Equation 1, used by the probability computation module 208 to compute the probability, is described above.

At step 408, the probability correction module 210 corrects the probability computed at step 406 for the popularity of the second item. To correct for the popularity of the second item, the probability correction module 210 utilizes Equation 2 as described above. Next, at step 410, the probability correction module 210 applies a noise function to the probability corrected for the popularity of the second item to compute a similarity score that indicates a similarity between the first item and the second item. Equation 3, used by the probability computation module 208 to apply the noise function to the corrected probability, is described above.

Once the similarity score that indicates the similarity between the first item and the second item is computed, at step 412, the recommendation 212 can determine whether to recommend the second item to a user when the user has previously interacted with the first item. In one embodiment, when the similarity score is above a pre-determined threshold, the first item and the second item are deemed to be sufficiently similar and the second item is recommended to the user.

Advantageously, digital content recommendations made to a user are more accurate when the technique described herein is used to determine similarity based on interaction patterns across a group of users.

While the foregoing is directed to embodiments of the present invention, other and further embodiments of the present invention may be devised without departing from the basic scope thereof. For example, aspects of the present invention may be implemented in hardware or software or in a combination of hardware and software. One embodiment of the present invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

What is claimed is:

1. A computer-implemented method for identifying two or more similar items within a plurality of digital content items available to a group of users, the method comprising:
   providing, via a web server, a web-based interface to a group of users for interacting with a plurality of digital content items, wherein the web-based interface is provided to each user of the group of users through a networked device and enables each user to individually interact with each of the plurality of digital content items;
   determining, at the web server, a first count that indicates a number of times users within the group of users have interacted with any other item in the plurality of digital content items, after interacting with a first item included in the plurality of digital content items, the group of users interacting with the first item via web content browsers interacting with the web server through a network;
   determining, at the web server, a second count that indicates a number of times users within the group of users have interacted with a second item included in the plurality of digital content items, after interacting with the first item, the group of users interacting with the second item via web content browsers interacting with the web server through a network;
   computing, by operation of one or more computer processors, a likelihood of a particular user within the group of users interacting with the second item after interacting with the first item, based on the first count and the second count;
   computing a similarity score indicative of a similarity between the first item and the second item, based on the computed likelihood and a popularity score associated with the second item; and
   transmitting a recommendation for the second item, via a web content browser, to a user that has interacted with the first digital content item, via the web content browser, based on the similarity score.

2. The method of claim 1, wherein the popularity score associated with the second item indicates the likelihood that the particular user will randomly interact with the second item.

3. The method of claim 2, wherein computing the similarity score further comprises:
   computing a ratio of the likelihood to the popularity score associated with the second item and a second popularity score associated with the first item; and
   combining the computed ratio with the computed likelihood.

4. The method of claim 1, further comprising applying a noise correction function to the similarity score to account for any inaccurate and/or low-volume data that was captured in the first count or the second count.

5. The method of claim 1, wherein the first count and the second count are identified from data that was captured in periods of time when both the first item and the second item were accessible to the group of users.

6. The method of claim 1, wherein for purposes of computing the likelihood, the second count is weighted based on a metric related to a first user within the group of users who has interacted with the first item.

7. The method of claim 6, wherein the metric indicates a strength of the interaction with the first item, wherein when the interaction is a view of the first item, the strength is a duration of time that the first user viewed the first item.

8. The method of claim 6, wherein the first user has also interacted with the second item, and the metric indicates an amount of time that elapsed between a point in time when the first user interacted with the first item and a point in time when the first user interacted with the second item.

9. The method of claim 1, wherein determining the first count comprises analyzing an interaction history associated with the group of users to determine the number of times any user within the group of users had interacted with the first item.

10. The method of claim 1, wherein the first item and the second item each comprise digital media.

11. A non-transitory computer-readable medium storing instructions that, when executed by a processor, cause the processor to identify two or more similar items within a plurality of digital content items available to a group of users, by performing the steps of:
providing, via a web server, a web-based interface to a group of users for interacting with a plurality of digital content items, wherein the web-based interface is provided to each user of the group of users through a networked device and enables each user to individually interact with each of the plurality of digital content items;
determining, at web server, a first count that indicates a number of times users within the group of users have interacted with any other item in the plurality of digital content items, after interacting with a first item included in the plurality of digital content items, the group of users interacting with the first item via web content browsers interacting with the web server through a network;
determining, at the web server, a second count that indicates a number of times users within the group of users have interacted with a second item included in the plurality of digital content items, after interacting with the first item, the group of users interacting with the second item via web content browsers interacting with the web server through a network;
computing, by operation of one or more computer processors, a likelihood of a particular user within the group of users interacting with the second item after interacting with the first item, based on the first count and the second count;
computing a similarity score indicative of a similarity between the first item and the second item, based on the computed likelihood and a popularity score associated with the second item; and
transmitting a recommendation for the second item, via a web content browser, to a user that has interacted with the first digital content item, via the web content browser, based on the similarity score.

12. The non-transitory computer-readable medium of claim 11, wherein the popularity score associated with the second item indicates the likelihood that the particular user will randomly interact with the second item.

13. The non-transitory computer-readable medium of claim 12, wherein computing the similarity score further comprises:
computing a ratio of the likelihood to the popularity score associated with the second item and a second popularity score associated with the first item; and
combining the computed ratio with the computed likelihood.

14. The non-transitory computer-readable medium of claim 11, further comprising applying a noise correction function to the similarity score to account for any inaccurate and/or low-volume data that was captured in the first count or the second count.

15. The non-transitory computer-readable medium of claim 11, wherein the first count and the second count are identified from data that was captured in periods of time when both the first item and the second item were accessible to the group of users.

16. The non-transitory computer-readable medium of claim 11, wherein for purposes of computing the likelihood, the second count is weighted based on a metric related to a first user within the group of users who has interacted with the first item.

17. The non-transitory computer-readable medium of claim 16, wherein the metric indicates a strength of the interaction with the first item, wherein when the interaction is a view of the first item, the strength is a duration of time that the first user viewed the first item.

18. The non-transitory computer-readable medium of claim 16, wherein the first user has also interacted with the second item, and the metric indicates an amount of time that elapsed between a point in time when the first user interacted with the first item and a point in time when the first user interacted with the second item.

19. The non-transitory computer-readable medium of claim 11, wherein determining the first count comprises analyzing an interaction history associated with the group of users to determine the number of times any user within the group of users had interacted with the first item.

20. A computer system, comprising:
a processor; and
a memory containing a program that, when executed by the processor, performs an operation for identifying two or more similar items within a plurality of items available to a group of users, the operation comprising:
providing, via a web server, a web-based interface to a group of users for interacting with a plurality of digital content items, wherein the web-based interface is provided to each user of the group of users through a networked device and enables each user to individually interact with each of the plurality of digital content items;
determining, at the web server, a first count that indicates a number of times users within the group of users have interacted with any other item in the plurality of digital content items, after interacting with a first item included in the plurality of digital content items, the group of users interacting with the first item via web content browsers interacting with the web server through a network,
determining, at the web server, a second count that indicates a number of times users within the group of users have interacted with a second item included in the plurality of digital content items, after interacting with the first item, the group of users interacting with the second item via web content browsers interacting with the web server through a network,
computing, by operation of one or more computer processors, a likelihood of a particular user within the group of users interacting with the second item after interacting with the first item, based on the first count and the second count,
computing a similarity score indicative of a similarity between the first item and the second item, based on the computed likelihood and a popularity score associated with the second item, and
transmitting a recommendation for the second item, via a web content browser, to a user that has interacted with the first digital content item, via the web content browser, based on the similarity score.

* * * * *